April 18, 1939. A. MARTINEZ BEDOLLA 2,154,483
THRESHING MACHINE WITH OPEN CENTRIFUGAL CHAMBER
Filed Feb. 8, 1936 3 Sheets-Sheet 1

INVENTOR:
AGUSTIN MARTINEZ B.
BY: Francis E. Boyce
ATTORNEY

April 18, 1939.  A. MARTINEZ BEDOLLA  2,154,483

THRESHING MACHINE WITH OPEN CENTRIFUGAL CHAMBER

Filed Feb. 8, 1936  3 Sheets-Sheet 2

INVENTOR:
AGUSTIN MARTINEZ B.

BY: Francis E. Boyce

ATTORNEY

April 18, 1939.   A. MARTINEZ BEDOLLA   2,154,483
THRESHING MACHINE WITH OPEN CENTRIFUGAL CHAMBER
Filed Feb. 8, 1936   3 Sheets-Sheet 3

INVENTOR:
AGUSTIN MARTINEZ B.

BY: Francis E. Boyce

ATTORNEY

Patented Apr. 18, 1939

2,154,483

UNITED STATES PATENT OFFICE 2,154,483

THRESHING MACHINE WITH OPEN CENTRIFUGAL CHAMBER

Agustín Martínez Bedolla, Mexico, D. F., Mexico

Application February 8, 1936, Serial No. 63,042
In Mexico November 7, 1935

8 Claims. (Cl. 130—27)

This invention relates to a threshing machine.

One object of the present invention is to provide a threshing machine having a novel arrangement of centrifugal chamber extending longitudinally of the machine for substantially its entire length.

A second important object of the invention is to provide a novel form of beater for such a machine.

A third important object of the invention is to provide an improved arrangement for sifting out and gathering the grain and small particles of straw as the material passes through the cylinder.

A fourth important object of the invention is to provide an improved pneumatic means for separating the chaff from the grain.

A fifth important object of the invention is to arrange the chaff separating means in a novel manner above the threshing cylinder in order to conserve space and to provide a novel conveyor arrangement for gathering the grain and chaff and conveying it to the separator.

A sixth important object of the invention is to provide a novel arrangement of means whereby any grain carried away by the separator with the chaff may be recovered therefrom.

A seventh important object of the invention is to provide a novel arrangement wherein a single fan or blower acts to produce an air current serving both to separate the grain and chaff and to blow the separated straw out of the threshing machine.

An eighth important object of the invention is to provide a novel arrangement of preliminary breaker and main threshing chamber whereby the straw is so broken that it may be readily conveyed through the main cylinder.

With the above and other objects in view as will be hereinafter apparent, the invention consists in general of certain novel details of construction and combination of parts hereinafter fully described, illustrated in the accompanying drawings and specifically claimed.

In the accompanying drawings like characters of reference indicate like parts in the several views, and:

Figure 5:
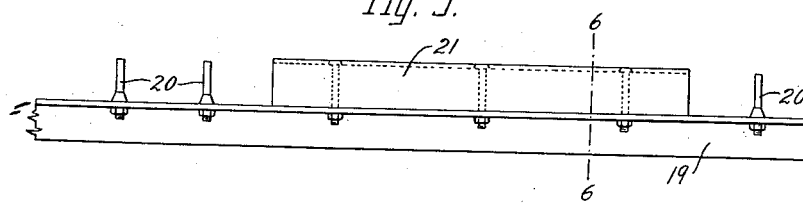
Fig. 5 is a fragmentary detail section on the line 5—5 of Fig. 4.
Figure 6:
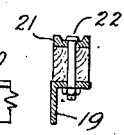
Fig. 6 is a section on the line 6—6 of Fig. 5.

In the embodiment of the invention here disclosed there is shown an under or main frame 10 supported by a pair of wheels 11 adjacent its forward or intake end A and by a steering wheel or caster arrangement 12 at its outlet end B. Extending from one end of the under frame 10 to the other is a casing 13. Suitably journalled, as at 14, on the casing ends are the journals 15 of the main beater, one of these journals having a belt pulley 16 fixed thereon so that the thresher may be driven by a belt from any suitable source of power. This main beater comprises a pair of heads 17 which are connected by a square prismatic structure consisting of four plates 18 arranged to form the sides of a square tube and having angle bars 19 extending along each corner edge of the tube, one flange of each angle bar being held between the proximal edges of a respective pair of plates 18 while the other flange carries projecting beater pins 20. Between certain of the pins beater bars 21 may be secured to the angle bars by bolts 22 as shown in Figs. 5 and 6. The number and extent of these beater bars 21 may vary in accordance with the requirements for the particular grain to be threshed. In some instances these breaker bars may extend the entire lengths of the angle bars. Surrounding this main beater is a cylinder formed by a tubular casing having a lower half 23 concentric to the beater and its upper half 24 eccentric to the beater, the axis of the portion 24 being spaced above and parallel to the axis of the beater. In this upper part of the cylinder is fixed a series of lunate plates 25 arranged to form like segments of a helix concentric to the beater. This cylinder is supported in the main casing 13 by brackets 26 which closes the spaces between the upper edges of the sides of the main casing and the cylinder. The lower part of the cylinder is provided with a multiplicity of perforations wherethrough the grain and chaff may fall during the threshing operation.

At the intake end the cylinder is cut away to leave an opening 27 at one side and extending laterally from this open part of the cylinder is a lateral intake casing 28 having an arcuate bottom 29 provided with fingers 30 to form a breaker concave. Journalled in the casing 28 concentrically of the concave is a breaker beater 31 having radial beater arms 32. The cereal to be threshed is fed into this intake casing through a chute 33 which extends laterally of the machine and opens into the casing 28. Preferably the casing 28 is detachably connected to the cylinder so that it may be removed and the cereal fed directly to the cylinder through the opening 27.

Figure 1:
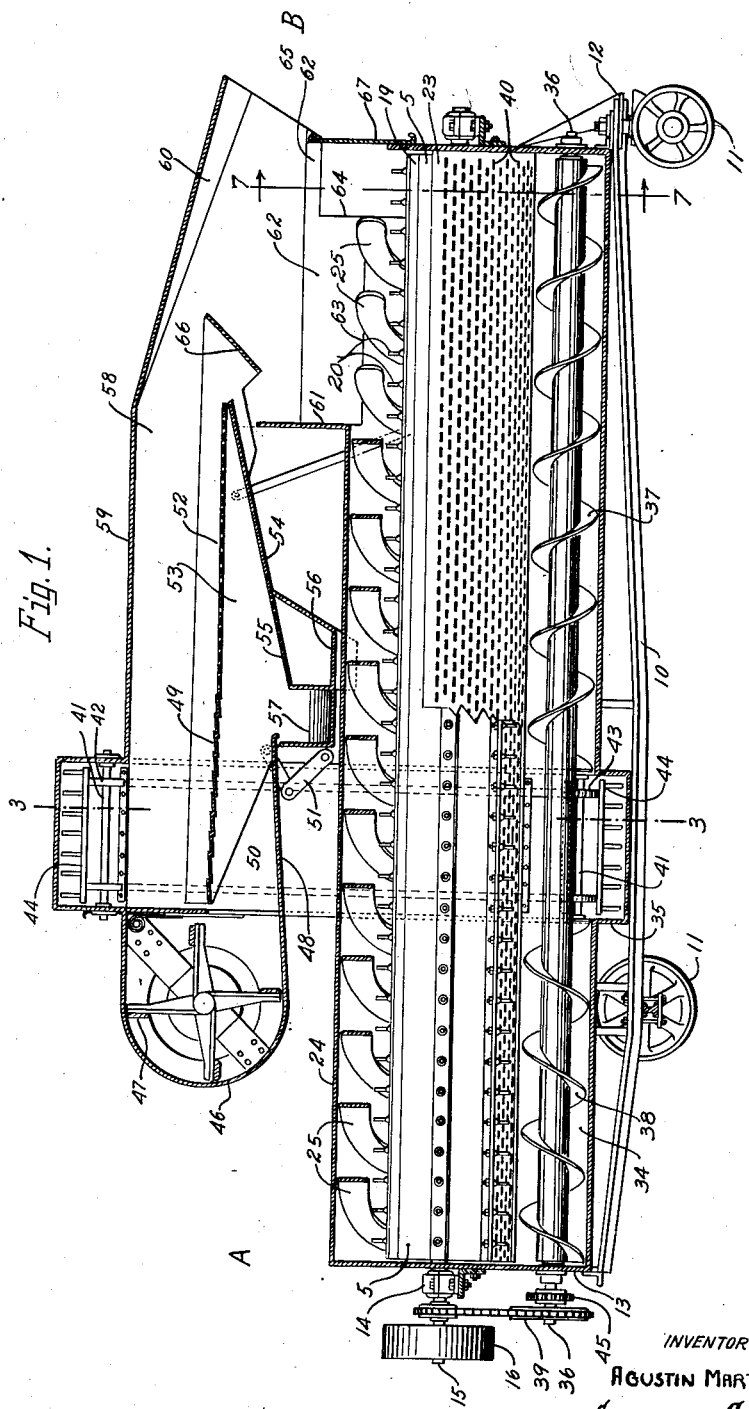
Fig. 1 is a longitudinal vertical section, partly in elevation, through the machine.
Figure 2:
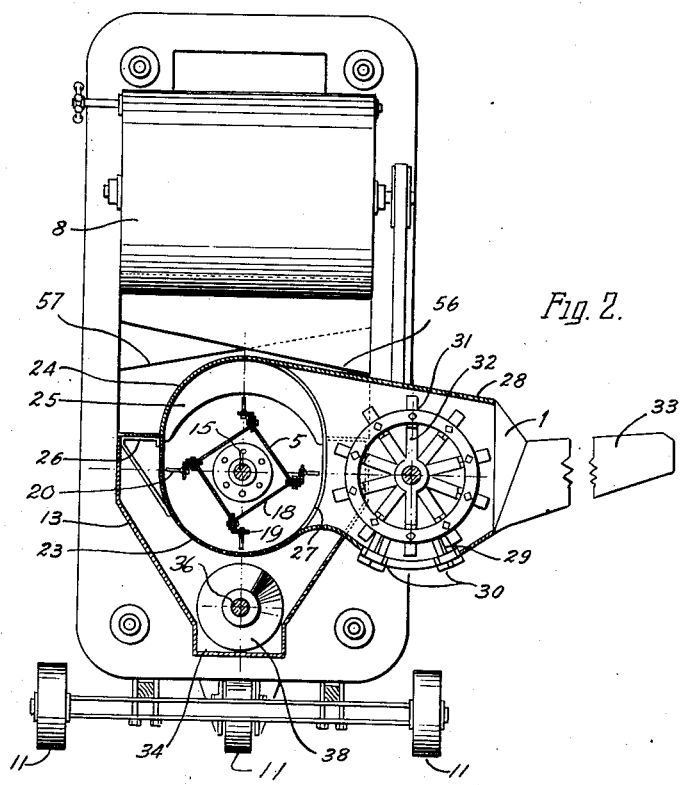
Fig. 2 is an end view of the machine with the preliminary breaker being shown attached and in section.
Figure 4:
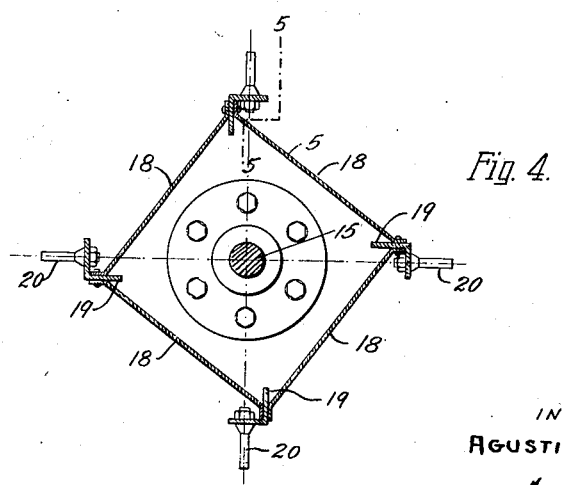
Fig. 4 is an enlarged detail cross section through the main beater.
Figure 3:
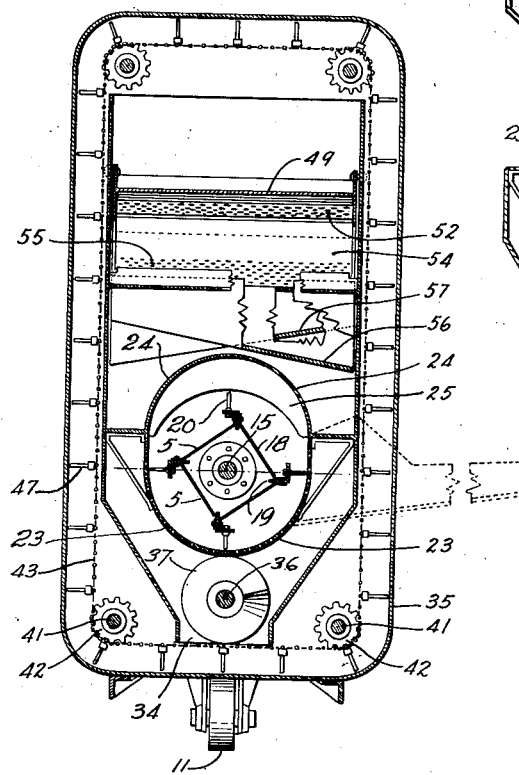
Fig. 3 is a section on the line 3—3 of Fig. 1.
Figure 7:
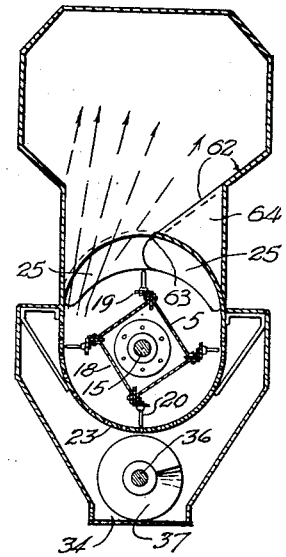
Fig. 7 is a fragmentary section on the line 7—7 of Fig. 1.

The lower parts of the sides of the casing 13 are inclined toward each other and at the bottom of the casing is a conveyor trough 34. An elevator housing 35 surrounds the casing intermediate its ends and this housing extends up above the casing 13. The bottom of the trough 34 is cut away opposite the housing 35 so that material conveyed along the trough may fall through the opening thus formed and lie on the bottom or floor of the elevator housing. Through the trough 34 extends a shaft 36 and on one end portion of this shaft is fixed a right hand screw or worm conveyor 37 while the other end portion of the shaft carries a similar left hand conveyor 38. The shaft 36 has chain and sprocket connection, as at 39, to the shaft 15. Thus, as the beater revolves, the conveyor worms revolve to carry material passing through the perforations 40 formed in the lower half of the cylinder 23 to the elevator housing and there deposited. The elevator housing is of generally rectangular form and shafts 41 are supported in each longitudinal edge portion of the housing 35. Each of these shafts carries a pair of spaced sprockets 42 close to the front and rear walls of the housing 35. Around the sprockets 42 are trained sprocket chains 43 and these chains carry conveyor flights 44, the arrangement being such that these flights pick up the material from the bottom of the conveyor, carry it up one side of the housing 35 and start it across the top of said housing. The elevator has one of its shafts driven as by a chain and sprocket connection indicated at 45 in Fig. 1. Mounted on the rear wall of the housing 35 is a fan or blower casing 46 wherein is a fan or blower 47. The fan casing opens at its lower half into the housing 35 below the upper run of the elevator and the lower wall of the fan casing is continued forwardly across the fan housing as at 48. A slide 49 controls the opening of the casing 46 into the elevator housing. A pan 49 extends forwardly from a point adjacent the rear wall of the housing 35 forwardly through an opening in the front wall of the housing 35 and is supported on a frame 50. This frame is supported on a rocker 51 by which the frame and pan may be oscillated. Extending forwardly from the front edge of the pan 49 is a cleaning sieve 52 which extends between the top edges of the side walls 53 of the frame 50 and these side walls are supported on links so that the pan and screen or sieve may be oscillated. The front portions of the side walls 53 have their lower edges sloping downwardly from front to rear and between the forward portions of these lower edges extends an inclined bottom member 54 while just to the rear of this bottom member is a small screen 55 covering a transverse delivery trough or chute 56. To the rear of the chute 56 is a second transverse delivery chute 57. These delivery chutes incline downwardly in opposite directions. The side walls of the main casing 13 are extended up above the pan and main screen 52 as at 58 and the upper casing thus formed is closed by a top wall 59 having a downwardly inclined forward portion 60. The chutes 56 and 57 open out through said side walls 58. Between the side walls 58 and below the forward portion of the bottom 54 is a transverse partition 61 and between this partition and the front of the main casing is an inclined plate 62 which extends downwardly from one side wall to an opening 63 in the top of the cylinder 23. A guide plate 64 extends upwardly from the cylinder to an outlet opening 65. Spaced from the forward edge of the screen 52 is an inclined baffle plate 66. The opening 65 may be regulated in size by a sliding gate 67.

In operation, the cereal is fed over the chute 33 between the breaker 31 and concave 30 so that it passes into the cylinder 23 where it is beaten and carried around by the action of the beater. This movement around the cylinder causes the straw to move forwardly by the action of the helical segments 25 until it reaches the opening 63 in the top of the cylinder. As the straw and grain are beaten the grain is beaten from the straw and falls, with the chaff through the openings 40 into the trough 34 where it is conveyed up the elevator and dumped on the pan 49. Due to the oscillatory movement of the pan the grain and chaff will be fed forward and pass onto the screen 52. Here it is subjected to the air blast from the fan 47 which carries off the chaff while the major portion of the grain, being heavier than the chaff, falls onto the plate 54 and passes down to the screen 55 which permits part of the grain to pass into the chute 56 while the remainder of the grain passes into the chute 57. From the chutes the grain is delivered to the outside of the machine. If any of the grain is carried over with the chaff from the screen 52 it will strike against the baffle 66 and be checked in its forward movement so that it drops through the opening 63 into the trough 34 for reconveyance to the pan as before. At the forward end of the cylinder the threshed straw is thrown upwardly by centrifugal action whereupon the air passing out of the opening 65 will carry the straw out of the machine.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a threshing machine, a main cylinder, a beater revoluble therein, said main cylinder having a perforated lower segment for the passage of grain and chaff, a conveyor beneath said cylinder along which grain and chaff passes, an elevator extending up from the conveyor, a screening mechanism into which said elevator delivers, means to move the material along the cylinder as the beater rotates, said cylinder being open at its top at one end to form a straw outlet, a fan having a delivery opening communicating with the screening mechanism to blow air therethrough, and a casing surrounding the screening mechanism and having a portion extending over the opening in the cylinder and forming an outlet whereby straw from the cylinder is picked up by the blast from said fan and ejected from the threshing machine.

2. In a threshing machine, a main cylinder, a beater revoluble therein, said main cylinder having a perforated lower segment for the passage of grain and chaff, a conveyor beneath said cylinder along which grain and chaff passes, an elevator extending up from the conveyor, a screening mechanism into which said elevator delivers, means to move the material along the cylinder as the beater rotates, said cylinder being open at its top at one end to form a straw outlet, a fan having a delivery opening communicating with the screening mechanism to blow air therethrough, a casing surrounding the screening mechanism and having a portion extending over the opening in the cylinder and forming an outlet whereby straw from the cylinder is picked up by the blast from said fan and ejected from the threshing machine, and a baffle extending across said casing in the path of the air from the cleaning mechanism to check the movement of seed carried over from the cleaning mechanism and permit it to drop through the cylinder opening.

3. In a threshing machine, a main cylinder, a beater revoluble therein, said main cylinder having a perforated lower segment for the passage of grain and chaff, a conveyor beneath said cylinder along which grain and chaff passes, an elevator extending up from the conveyor, a screening mechanism into which said elevator delivers, means to move the material along the cylinder as the beater rotates, said cylinder being open at its top at one end to form a straw outlet, a fan having a delivery opening communicating with the screening mechanism to blow air therethrough, and a casing surrounding the screening mechanism and having a portion extending over the opening in the cylinder and forming an outlet whereby straw from the cylinder is picked up by the blast from said fan and ejected from the threshing machine, said cylinder having a lateral opening at its other end forming an inlet, an inlet casing leading from the last named opening, and a breaker and concave in said inlet casing effecting preliminary breaking of the straw.

4. In a threshing machine, a main cylinder, a beater revoluble therein, said main cylinder having a perforated lower segment for the passage of grain and chaff, a conveyor beneath said cylinder along which grain and chaff passes, an elevator extending up from the conveyor, a screening mechanism into which said elevator delivers, means to move the material along the cylinder as the beater rotates, said cylinder being open at its top at one end to form a straw outlet, a fan having a delivery opening communicating with the screening mechanism to blow air therethrough, a casing surrounding the screening mechanism and having a portion extending over the opening in the cylinder and forming an outlet whereby straw from the cylinder is picked up by the blast from said fan and ejected from the threshing machine, a baffle extending across said casing in the path of the air from the cleaning mechanism to check the movement of seed carried over from the cleaning mechanism and permit it to drop through the cylinder opening, said cylinder having a lateral opening at its other end forming an inlet, an inlet casing leading from the last named opening, and a breaker and concave in said inlet casing effecting preliminary breaking of the straw.

5. In a threshing machine, a revoluble beater constituting a square tube having flat side walls and provided at its longitudinal edges with angle bars each having one leg secured between the proximal edges of a respective pair of said walls and having its other leg provided with beater elements.

6. In a threshing machine, a main casing having conveyor means extending along its lower part, a cylinder in said casing having perforated lower segment discharging grain and chaff into said conveyor means, said cylinder having a lateral outlet at one end, a beater in said cylinder acting to thresh the straw and to eject the same in a tangential path through said outlet, a separator mechanism above a portion of the cylinder remote from the outlet, and elevator means receiving grain and chaff from the conveyor means and discharging into the separator mechanism, said separator mechanism including a fan arranged to cause an air current to separate the chaff from the grain, said current being directed across the tangential path traversed by the straw to entrain the latter.

7. In a threshing machine a revoluble thresher consisting of a prismatic structure composed of continuous plates forming the sides of the prism, with threshing means located at the corner edges thereof, a main continuous cylinder surrounding the prismatic thresher having a perforated lower segment for passage of grain and chaff, said prismatic structure occupying a main portion of the cylinder, a series of adjustable lunate plates uniformly spaced along the whole length of the cylinder forming like segments of a regular helix, to produce a helical path within the cylinder for the material as the thresher rotates, and a lateral outlet at the end of said cylinder for the tangential exit of straw as it arrives at the end of its like helical movement.

8. That method of threshing seed bearing straw which consists in beating the straw to cause the grain and chaff to separate from the straw while causing the straw to move along a helical path, separating the grain and chaff from the straw, utilizing the centrifugal force caused by the helical movement of the straw to effect tangential movement of the straw at the end of its helical path, subjecting the chaff and grain to a current of air to blow the chaff away from the grain and directing the said air across the tangential path of the straw to cause delivery movement of the straw.

AGUSTÍN MARTÍNEZ BEDOLLA.